United States Patent [19]
Imanaka

[11] Patent Number: 4,685,750
[45] Date of Patent: Aug. 11, 1987

[54] RAILWAY VEHICLE BRAKE SYSTEM WITH IMPROVED BLENDING CONTROL OF PNEUMATIC AND ELECTRIC BRAKES

[75] Inventor: Asaji Imanaka, Kobe, Japan

[73] Assignee: Nippon Air Brake Co., Ltd., Kobe, Japan

[21] Appl. No.: 902,859

[22] Filed: Sep. 2, 1986

Related U.S. Application Data

[62] Division of Ser. No. 720,670, Apr. 8, 1985, Pat. No. 4,639,047.

[30] Foreign Application Priority Data

Apr. 13, 1984 [JP] Japan ............................ 59-55311[U]

[51] Int. Cl.[4] ........................ B60T 13/70; B60T 15/54

[52] U.S. Cl. .......................................... 303/15; 303/3; 303/20

[58] Field of Search ................... 303/3, 15, 20, 40, 28, 303/29; 330/86, 282; 328/162, 165

[56] References Cited

U.S. PATENT DOCUMENTS 3,868,150 2/1975 Maskery ................................ 303/3
3,944,287 3/1976 Nagase .................................. 303/3
3,974,436 8/1976 Timpe .................................. 330/86
4,079,334 3/1978 Hamilton ............................. 330/86
4,500,845 2/1985 Ehni ..................................... 330/86

FOREIGN PATENT DOCUMENTS 0148105 11/1981 Japan .................................... 303/15

*Primary Examiner*—John W. Caldwell, Sr.
*Assistant Examiner*—Alvin Oberley
*Attorney, Agent, or Firm*—G. J. Falce

[57] ABSTRACT

A railway vehicle brake control system in which a fluid pressure brake continuously supplements the electric brake as the electric brake effectiveness fades during vehicle slowdown. An amplifier circuit output signal corresponding to the electric brake effectiveness is modified by adjusting the amplifier gain in response to a detector sensing the initial drop in the electric brake effectiveness. This modified amplifier output signal is subtracted from a brake command signal to obtain a difference signal, the value of which establishes the amount of fluid pressure braking necessary to supplement the electric brake deficiency. The arrangement compensates for hysteresis and response delay in the pneumatic valving required in the fluid pressure brake system, such that the total brake obtained corresponds substantially to the brake command both during and following transition from the electric brake to the fluid pressure brake.

5 Claims, 18 Drawing Figures

PRIOR ART

RAILWAY VEHICLE BRAKE SYSTEM WITH IMPROVED BLENDING CONTROL OF PNEUMATIC AND ELECTRIC BRAKES

This is a division of application Ser. No. 720,670, filed Apr. 8, 1985 now U.S. Pat. No. 4,639,047.

BACKGROUND OF THE INVENTION

This invention relates to a railway car brake control system and particularly to such a system that blends the electric brake and the fluid brake, such as an air brake, to make up for a deficiency in the power of the electric brake with the power of the fluid brake when the electric brake power is not enough for the brake power command signal.

When the brake control changes from electric brake system to the fluid brake system, the total brake power (the sum of the electric brake power and the fluid brake power) usually becomes lower, due to the hysteresis effect that the electric-fluid pressure converting valve has and the response delay of the fluid pressure. This invention is concerned with preventing this lowering of the brake power.

Following is an explanation of known brake control systems using FIG. 1 to FIG. 5. In FIG. 1, 1*a* is the brake power setter, such as an electrical digital to analog transducer.

The brake power setter 1*a* converts the three-bit digital signal, which is generated by the brake valve BV (not shown) via train line wires SB1, SB2, SB3 into an analog signal, depending on the brake power command signal, E. The electromagnetic valves MV1, MV2 and MV3 are supplied with a pressurized fluid which is adjusted according to the car weight, and which comes from the weight system 2*b* that is connected to the pressurized fluid source. MV1, MV2 and MV3 supplies and releases the suitable pressurized fluid, which is determined by the car weight, to the diaphragm chambers C1, C2 and C3 of the operational relay valve 4, after being magnetically operated in accordance with the previously-described three-bit digital signal.

The electric brake system EB functions according to the brake power command signal, which comes from the brake power setter 1*a*, to provide electric brake power to the car. The first detector 11 detects actual electric brake power that is effective from the motor current etc., and outputs it as the electric brake feedback signal Ei. The amplifier circuit 13 inputs the electric signal Ei, which comes from the 1st detector 11, and outputs Eo, here Eo=K (Ei+A), to convert it to a control level. Here, K is the amplification ratio and A is the set value. In the electropneumatic converter valve EP, the solenoid SOL produces electromagnetic force according to output signal Eo of amplifier circuit 13. Under the influence of this force, the valve rod 51 opens the supply valve 52. Supply pressure is thus connected to the valve outlet via chamber 53. This fluid pressure in the output chamber 53 is effective to force the balance piston 54 in an upward direction opposing the force exerted by solenoid SOL. When the solenoid force and the fluid pressure force become balanced, two-way valve rod 51 engages valve 52, which is in turn engaged with the supply valve seat, so that output chamber 53 is kept at that fluid pressure.

Since the output chamber 53 is connected to the diaphragm plate chamber C4 of the operational relay valve 4, the electropneumatic converter valve EP supplies or releases pressurized fluid to the diaphragm plate chamber C4, depending on the signal Eo, which is the output of amplifier circuit 13. The pressurized fluid which is supplied to the diaphragm plate chambers C1, C2, C3, through the operational relay valve 4, works to raise the valve rod 41 using the diaphragm plate pistons S1, S2, S3.

But, the pressurized fluid, which is supplied to the diaphram plate chamber C4, acts in the opposite direction. In other words, the operational relay valve 4 subtracts the output signal of amplifier circuit 13, which is the effective electric brake power signal derived from the brake power command signal; hence, it can be called an "operator".

In the case where the electric brake power is insufficient to satisfy the brake power command signal effective at the operational relay valve 4, the valve rod 41 opens the supply valve 42. Therefore, the fluid pressure of the output chamber rises and this pressure pushes down the balance piston S5. When both the up and down forces of the balance piston are equalized, the inlet-outlet valve rod 41 engages the supply valve 42, which in turn is engaged with its seat by a light spring, so that the output chamber 43 is kept at that fluid pressure. The output chamber 43 of the operational relay valve 4 is connected to the brake cylinder BC, which is part of the fluid brake system, and the brake cylinder is supplied and drained of pressurized fluid under control of the operational relay valve 4. In other words, in the above-described brake system, the deficiency in the electric brake power of the brake power command signal is supplemented with the fluid brake power of the brake cylinder BC. By the way, as shown in FIG. 2, the electropneumatic pressure converter valve EP does not function immediately as signal Eo increases from 0, the delay being due to the frictional resistance inside the valve. This delay is defined by the value W (FIG. 2).

So, in amplifier circuit 13, the bias signal A, which is equivalent to the point W, and which is a set value, is input together with the output signal Ei of the first detector 11. Amplifier output Eo is found by the equation Eo=K (Ei+A), as shown in FIG. 4. The amplifier circuit shown in FIG. 3, includes an input resistance R1 and a feedback resistance R2, the ratio (R2/R1) being the amplification ratio K.

Also, the electropneumatic pressure converter valve EP, as shown in FIG. 2, has hysteresis, in which the output pressure rises from point (W) to point (X) with an increase in its input, and falls from point (Y) to point (Z), via point (Y), with a decrease in the input; wherein the output pressure, when the input is decreasing, is higher than the output pressure when the input is increasing. Also, the change rate of the output pressure of the electropneumatic converter valve EP, i.e., the fluid brake power supplemental rate generally is delayed from the change rate of the electric brake power, i.e., the change rate of the output signal Eo of amplifier circuit 13. Therefore, in the above-described known brake control system, the sum of the electric brake power and the fluid brake power, i.e., the total brake power, becomes less during and after the transition from the electric brake to the fluid brake. This problem will be explained using FIG. 5. In FIG. 5*a*, the electric brake system EB is effectively working in accordance with the brake power command signal E. In such a state, when the car speed begins to decrease, the effectiveness of the electric brake power begins to decrease. This electric brake power is detected by the first detector 11, and the output signal Ei of the first detector 11 decreases until it becomes 0, as shown in FIG. 5*b*. However, the output signal Eo of amplifier circuit 13 does not decrease to 0 because of bias signal A, as shown in FIG. 5*c*. Even after the electric brake power totally loses its effect, this (K.A) is still input into the electropneumatic converter valve EP. Because of its hysteresis, the electropneumatic converter valve does not respond immediately to the decrease of the signal Eo. As shown in FIG. 5*d*, after a small delay, the output fluid pressure is reduced; and even after the electric brake completely loses its effect, there is still a residual pressure because of the bias signal A. In other words, while the electric brake power is decreasing, in the middle of the process, the output fluid pressure of the electropneumatic converter valve EP is higher than the fluid pressure corresponding to the actual electric brake power. And also, even if the electric brake power becomes 0, the electropneumatic converter valve EP still continues to output. This output fluid pressure of the converter valve EP will be subtracted from the fluid pressure, which is equivalent to the brake power command signal E at the operational relay valve 4. Therefore, the fluid brake power delays to begin to rise and therefor only reaches a lower level, as shown in FIG. 5*e*. Therefore, as shown in FIG. 5*f*, because of the reduced supplemental fluid brake power, the total brake power becomes lower when the electric brake is supplemented by the fluid brake, and as a result, the riders feel unpleasantness; and even after the braking power changes totally to the fluid brake, it still does not satisfy the total brake power, and the total stopping distance becomes longer. To solve this problem, especially the deficiency of the brake power, not during the transition from the electric to fluid brake, but after the transition, another known brake control system has been disclosed which is shown in Japanese Patent No. 56-148105. This second known brake control system, as shown in FIG. 6, was changed from the FIG. 1 style system by adding the second detector 12, which detects and outputs the total loss of the effect of the electric brake power, and the output Eo of amplifier circuit 13 is forced to 0 according to the output signal of the second detector 12. Also, the construction of amplifier circuit 13 is changed, as shown in FIG. 7. In other words, the second detector 12 gives an output only when the electric brake power is 0; and according to the output signal of this second detector, a normally open contact S is closed and the feedback resistance R2 is short-circuited. Hence, the output Eo of the amplifier 13 becomes 0. In other situations, the second detector is not outputting, so that the contact S is in the open position. Hence, output Eo of amplifier circuit 13 follows the equation $Eo=K(Ei+A)$. Therefore, as shown in FIG. 8*a*, when the electric brake is working effectively for the brake power command signal E, if the output signal Ei of the first detector 11 becomes lower (as shown in FIG. 8*b*), because of a decrease in the electric brake effectiveness as the car speed decreases, the output signal Eo of amplifier circuit 13 concurrently falls as in FIG. 8*c*. When Ei becomes 0, Eo also becomes 0, and the output fluid pressure of the electric-fluid pressure converting valve EP begins to fall with a delay, and suddenly it drops to 0 when Eo becomes 0. Therefore, although the output of the operational relay valve 4, i.e., the supplemental brake power, begins to rise with a delay, as in FIG. 8*e*, it rises more at the end to fill up the ordinary deficiency of FIG. 1. Therefore, as shown in FIG. 8*f*, the total brake power, after the transition to the fluid brake, does not have any deficiency. However, the total brake power during the transition from the electric brake to the fluid brake does not show any improvement for the deficiency of the supplemental fluid brake power; and, just like the known system of FIG. 1, the total brake power becomes lower and the riders feel unpleasantness and the stopping distance becomes longer.

SUMMARY OF THE INVENTION

Therefore, the object of this invention is to reduce the drop in the total brake power during the transition period, when the fluid brake is supplementing the electric brake, as well as following the transition period when full fluid brake power is effective. To obtain this goal in the above-described railroad car brake control system, a second detector has been added, which detects and outputs the initial drop in the electric brake power. The previously-described amplifier circuit was changed in order to lower its amplification ratio in response to the output signal of the second detector, in order to lower the output signal of the amplifier circuit by a certain amount.

BRIEF EXPLANATION OF THE DRAWINGS

These and other objects and advantages of the invention will become apparent from the following more detailed explanation when taken in conjunction with the attendant drawings in which.

DESCRIPTION AND OPERATION

Next, are explanations of actual examples of this invention using FIGS. 9 to 18.

Figure 1:
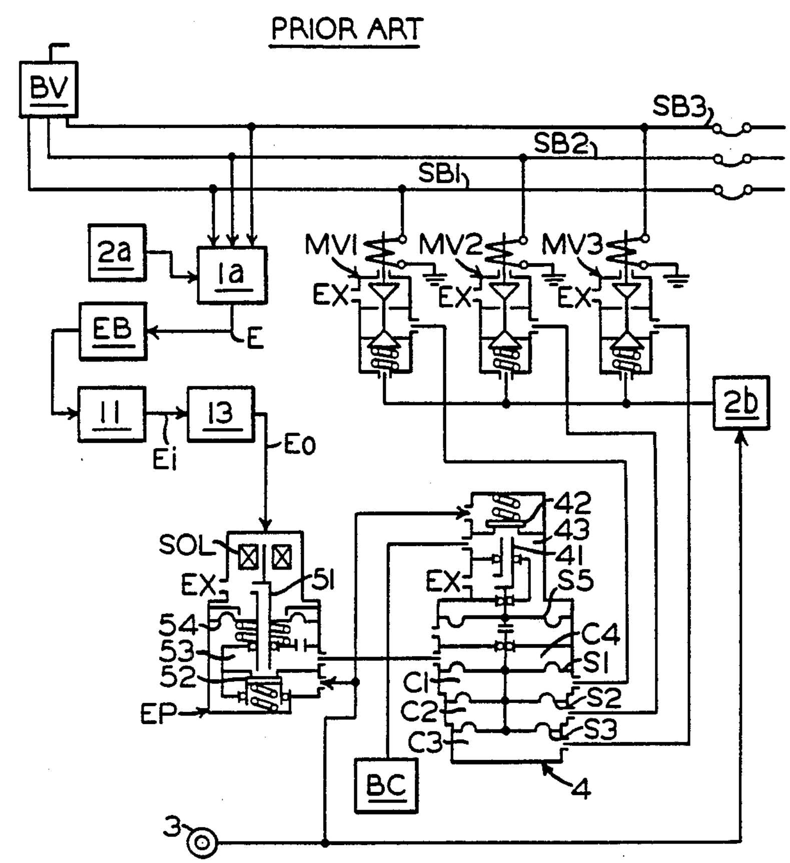
FIG. 1 shows a first type of known railroad car brake control system.
Figure 2:
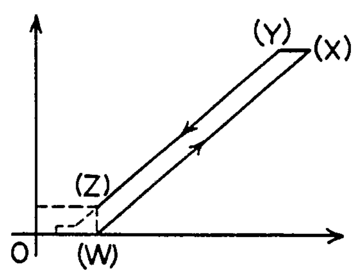
FIG. 2 shows a characteristic curve of the input and output of the electropneumatic converter valve EP of FIG. 1.
Figure 4:
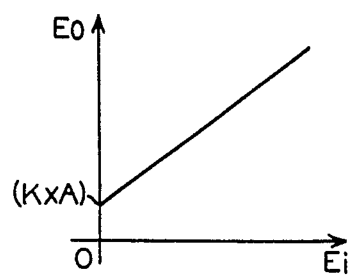
FIG. 4 shows a characteristic curve of the input and output of the amplifier circuit 13 of FIG. 1.
Figure 3:
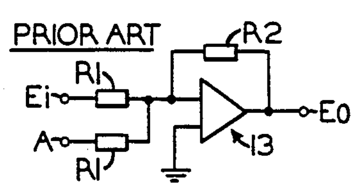
FIG. 3 shows the construction of the amplifier circuit 13 of FIG. 1.
Figure 7:
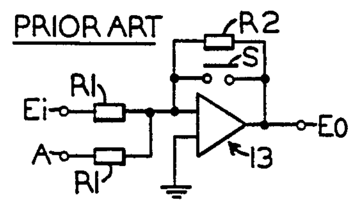
FIG 7 shows the construction of the amplifier circuit 13 of FIG. 6.
Figure 9:
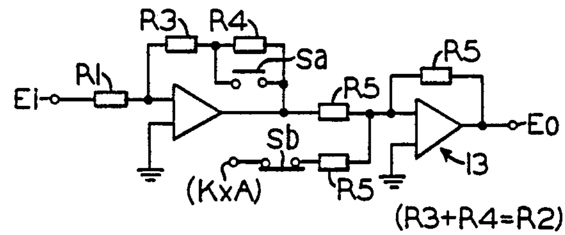
FIG. 9 shows an amplifier circuit 13 constructed in accordance with a first actual example of the invention.
Figure 6:
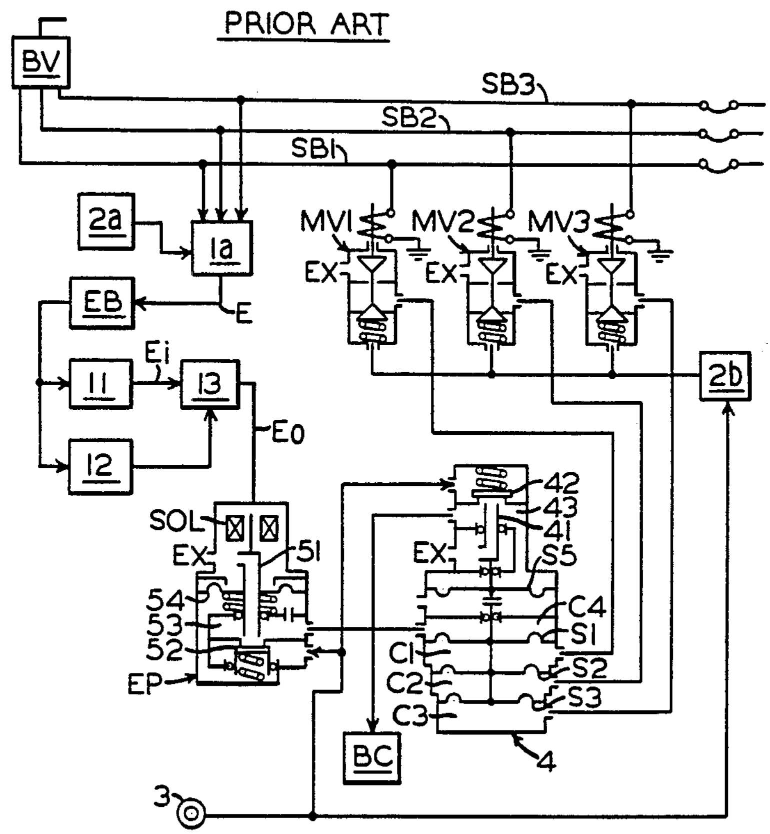
FIG. 6 shows a second type of known railroad car brake control system.
Figure 10:
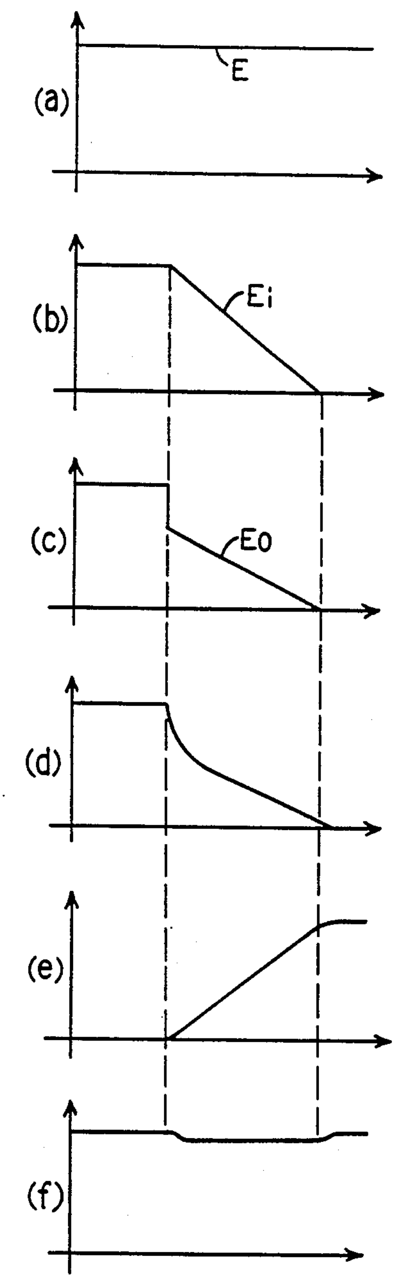
FIG. 10 is a series of graphs explaining the operation of the main part of the first actual example of the invention.
Figure 12:
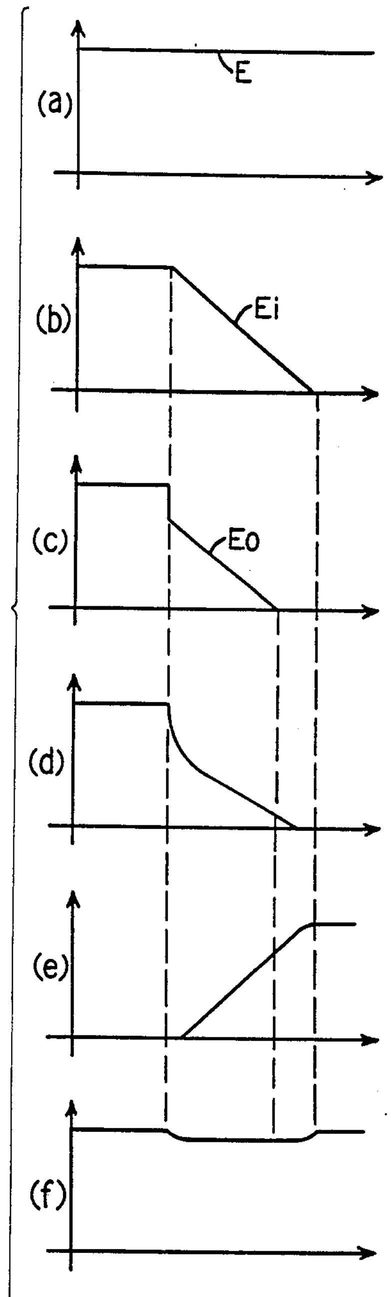
FIG. 12 is a series of graphs explaining the operation of the main part of a second actual example of the invention.

The construction of the first actual example of this invention is almost the same as in FIG. 6, but the function of the second detector 12 is different and the amplifier circuit 13 has been changed, as shown in FIG. 9. In the first actual example, the second detector 12 detects the beginning of the drop in the electric brake power and continues to output its detect signal until the electric brake power becomes 0 or until the brake command is turned off. Depending on the output signal of the second detector 12, the amplification ratio of amplifier circuit 13 in FIG. 9 is lowered. In FIG. 9, a normally open contact Sa is the first contact which is closed, depending on the output signal of the second detector 12. Normally closed contact Sb is the second contact which is concurrently opened, depending on the output signal of the second detector 12. The feedback resistance (R3+R4) is equal to R2 in FIG. 3, and it is set as (R3+R4)=R2. Therefore, in FIG. 9 the first contact Sa is open, and, at the same time, the contact Sb is closed so that output Eo of amplifier circuit 13 follows the equation Eo=K (Ei+A).

From this state, if Sa is closed and Sb is open, the output Eo of amplifier circuit 13 becomes Eo=K'·Ei. Here, K' is the amplification ratio R3/R1. Since R3<R2, it becomes K'<K. Namely, when the second detector detects a decrease in the electric brake power, the amplification ratio of amplifier circuit 13 decreases. FIG. 10*a* is the brake power command signal E. When the electric brake power falls with a decrease in the car speed, the output signal Ei of the first detector 11 decreases, as shown in FIG. 10*b*. When the electric brake power begins to fall, the second detector 12 detects it and the first contact Sa closes. At the same time, the second contact Sb opens, so that the amplification ratio of the amplifier circuit 13 decreases and its output signal Eo decreases as shown in FIG. 10*c*. Therefore, the output fluid pressure of the electropneumatic converter valve EP decreases, as in FIG. 10*d*, and accompanying this, the output fluid pressure of the operational relay valve 4, namely, the fluid brake power, rises as shown in FIG. 10*e*. The sum of this fluid brake power and the above-described electric brake power is the total brake power in FIG. 10*f*. In the first actual example, when the electric brake power falls, the amplification ratio of amplifier circuit 13 decreases, so that the output fluid pressure of the electropneumatic converter valve EP decreases. Therefore, the supplemental fluid brake power, during the transition period, becomes larger than in the known cases, and the drop in the total brake power is smaller than in the usual case; hence, the rider's unpleansantness and extended braking distances can be prevented. The setting of the amplification ratio can be done easily by adjusting the input resistance or feedback resistance. However, when the amplification ratio becomes too low, then the total brake power becomes too large; therefore, an appropriate adjustment must be made. Also, in the first actual example, when the electric brake power falls, the second contact point Sb removes the bias K·A. Therefore, the vehicle brake power, after completing the transition to the fluid brake, is also increased, thereby avoiding a drop-off in the effective brake power and a lengthening of the stop distance both during and after transition from the electric brake to the fluid brake.

Figure 11:
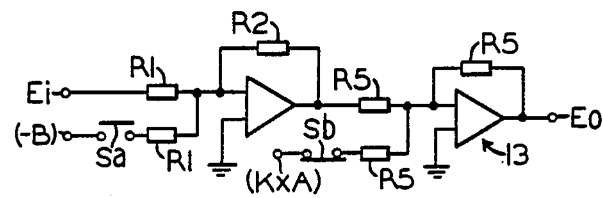
FIG. 11 shows an amplifier circuit 13 constructed in accordance with a second actual example of the invention.
Figure 5:
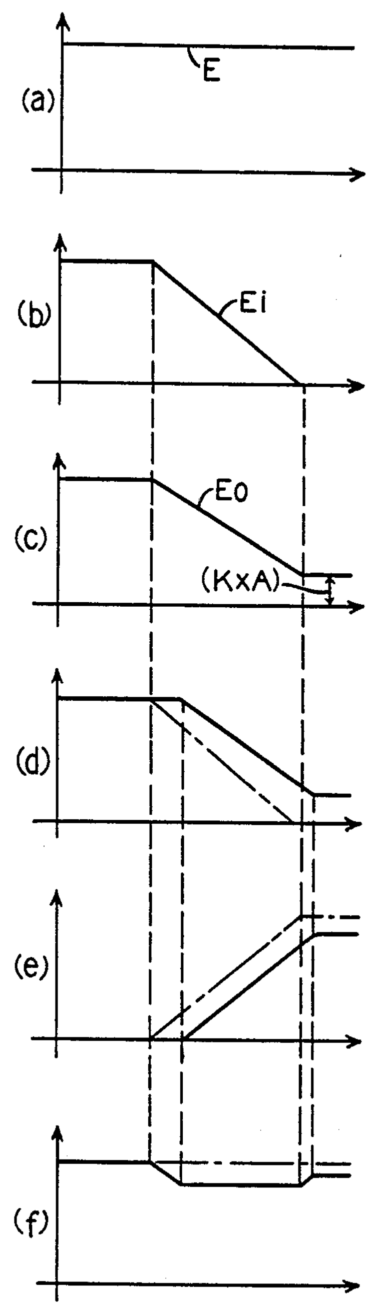
FIG. 5 is a series of graphs explaining the main part of the operation of the known system of FIG. 1.
Figure 8:
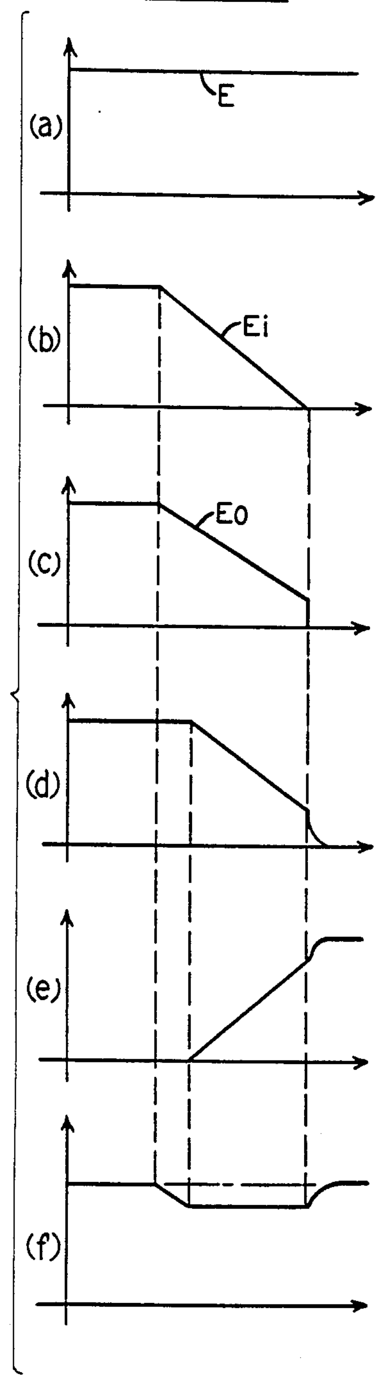
FIG. 8 is a series of graphs explaining the main part of the known system of FIG. 6.

FIG. 11 shows the main part of the second actual example of this invention, namely, another arrangement of the amplifier circuit 13 in FIG. 6. The other parts of this second actual example are the same as the first actual example, therefore the explanation has been omitted. In FIG. 11 also, the first normally open contact point Sa gets closed, depending on the output signal of the second detector 12, and the second normally closed contact point Sb gets opened by the output signal of the second detector 12. Therefore, in the state of FIG. 11, where Sa is open and Sb is closed, the output signal of amplifier circuit 13 is given by the equation Eo=K (Ei+A). From this state, if the first contact Sa is closed and the second contact Sb is opened, the output signal of amplifier circuit 13 becomes Eo=K (Ei−B). Here, B is a set value. At this time, when the second detector 12 detects a drop in the electric brake power, the output signal Eo of the amplifier circuit 13 decreases by the amount of K (A+B).

For the brake power command signal E, in FIG. 12*a*, when the electric brake power falls with a decrease in the car speed, the output signal Ei of the first detector 11 and the output signal Eo of the amplifier circuit 13 each follows the curve shown in FIG. 12*b* and FIG. 12*c*. Therefore, the output fluid pressure of the electropneumatic converter valve EP is as shown in FIG. 12*d*, the fluid brake power is as shown in FIG. 12*e*, and the total brake power is as shown in FIG. 12*f*. By this second actual example, when the electric brake power falls, the output signal Eo of the amplifier circuit 13 decreases by the amount of K (A+B), therefore the supplemental fluid brake power becomes larger than normal and during the transition state, when the electric brake changes to the fluid brake, the decrease in the amount of the total brake power is less than normal; hence, the riders do not feel unpleasantness and the stopping distance is not increased. Any value can be chosen for the above-described set value B. However, when the decreasing amount K (A+B) becomes too large, the total brake power becomes too great and therefore adjustment must be done carefully.

In the second actual example also, the bias K·A is removed by the second contact Sb when the electric brake power drops. Therefore, the total brake power, after the brake transition is completed, is sufficient.

In both the case of the first actual example and the second actual example, detector 12 may be a running current ratio detector to detect the fall of the electric brake. When the car is a chopper brake controlled car, the running current ratio can be indicated by the ratio of the "ON" time to the chopping cycle. Namely, when the car's speed slows down, the electric brake system EB cannot generate the power which is required, and since at this time the running current ratio is almost 100%, this becomes the detect signal. However, using a running current ratio detector as a second detector 12 is only one example. Anything that can detect a fall in the electric brake power can be used. Both the first and second actual examples use the fluid pressure operation method in which the electric output signal Eo is converted to a fluid pressure first, in order to subtract the electric brake power signal from the brake power command signal pneumatically.

Figure 14:
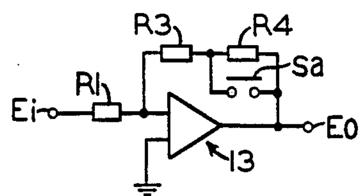
FIGS. 14 and 15 show different amplifier circuits 13 constructed in accordance with a third actual example of the invention.
Figure 15:
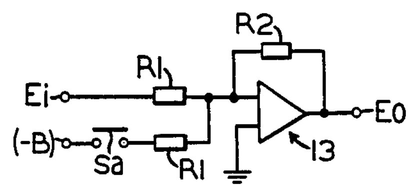
Figure 13:
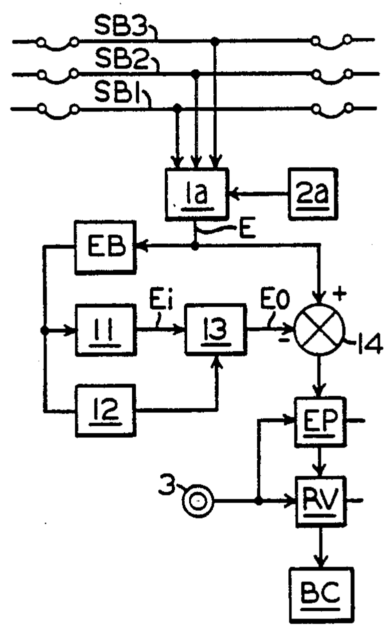
FIG. 13 shows a third actual example of the invention.

But the electric operation method can also be used, and an example of this is shown next. FIG. 13 shows the third actual example. The parts which are the same as in FIG. 6 are numbered in the same way and their explanation is omitted. However, the amplifier circuit 13 is the same as shown in FIG. 14 or FIG. 15.

Figure 16:
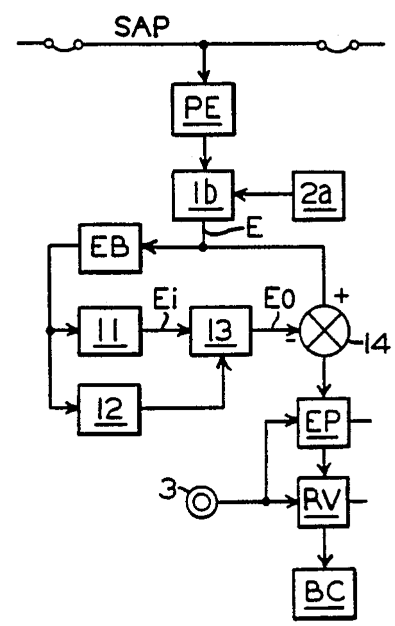
FIG. 16 shows a fourth actual example of the invention.

In FIG. 13, the operator 14 is in the form of a summing amplifier, which subtracts the output signal Eo of amplifier circuit 13, from the brake power command signal E electrically. The electrical output of operator 14 (E−Eo) is converted to fluid pressure by the electropneumatic converter valve EP. Depending on this fluid pressure, relay valve RV supplies the pressurized fluid to the brake cylinder (fluid brake system). FIG. 16 shows the fourth actual example. The same construction parts as in the third actual example in FIG. 13 are numbered the same, and their explanation is omitted. This fourth actual example also uses amplifier circuit 13, which is shown in FIG. 14 or FIG. 15. In FIG. 16, a straight air pipe SAP is interconnected between each of the cars. It's pressure is increased by operating a conventional brake valve (not shown in the Figure), and it is decreased by reversing the brake valve operation. The fluid pressure of this straight air pipe SAP is converted to an electric signal by a fluid pressure-electric converter PE, and is transferred to the brake setter 1*b*. The brake setter 1*b* outputs the brake power command signal E, depending on the car weight signal of the weight system 2*a*.

Figure 17:
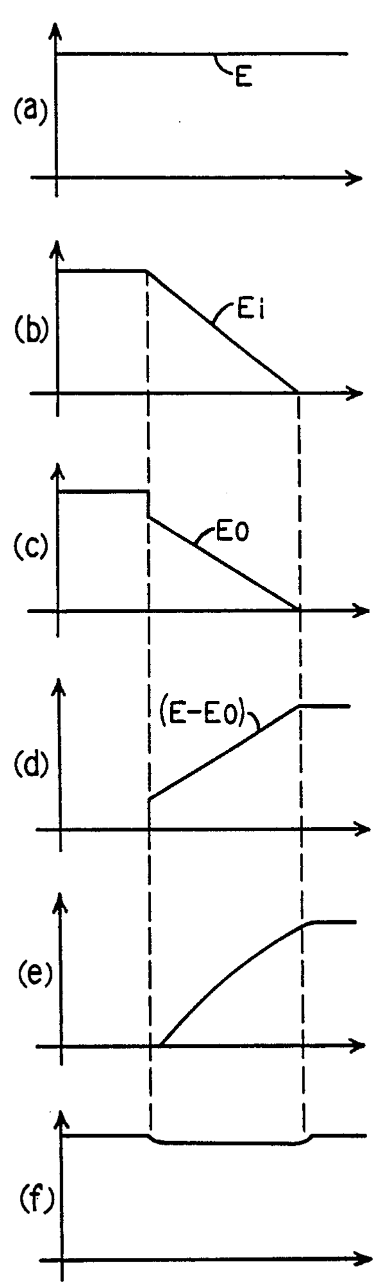
FIGS. 17 and 18 show a series of graphs explaining the operation of the main part of the third and fourth actual examples of the invention, respectively.
Figure 18:
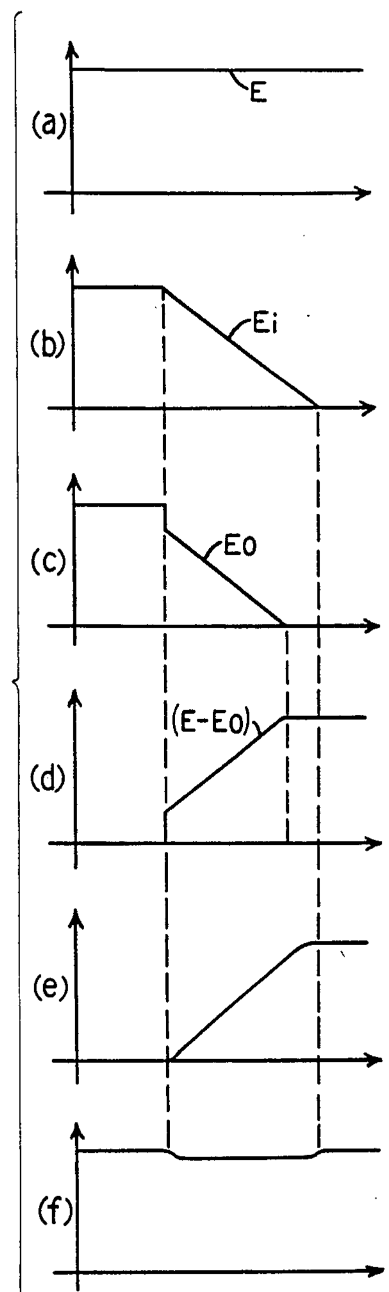

In the third and fourth actual examples, only the construction from the brake valve to the brake setter 1*a*, 1*b* is different, and the rest of it, namely, the construction of the electric brake system EB for the brake power command signal E, and the brake cylinder BC etc. are the same. Therefore, the main part of the operative explanation, in which amplifier circuit 13 of the third and fourth actual examples (FIG. 14, is shown in FIG. 18. In FIG. 17 and FIG. 18, (a) shows the brake power command signal E; (b) is the electric brake power, namely, the output signal Ei of the first detector 11; (c) is the output signal Eo of the amplifier circuit 13; (d) is the output signal E−Eo of the operator 14; (e) is the fluid brake power, namely, the fluid pressure of the brake cylinder BC; and (f) is the total brake power, namely, the sum of the electric brake power and the fluid brake power. The operation of the third and fourth actual examples is generally the same as the first and second actual examples; hence, their explanation is omitted. As these actual examples show in this invention about the railroad car brake control system, the output Eo, which is for the input Ei of amplifier circuit 13, decreases during the brake transition time in which the electric brake power falls as it switches to the fluid brake. Therefore, the hysteresis of the electropneumatic converter valve EP and the response delay can be compensated. The amount of the compensation can be set at any amount. Therefore, the fall in the total brake power is kept smaller than usual; hence, the rider's unpleasantness is prevented and also an increase in the stopping distance is prevented.

Having thus described the invention, what I claim as new and desire to secure by Letters Patent, is:

1. A brake control system for a railway vehicle having an electric brake system and a fluid pressure brake system, said brake control system comprising:

(a) means for providing a brake command signal according to the desired total brake power of said vehicle;

(b) said electric brake system being operative in response to said brake command signal to provide vehicle brake power;

(c) means for providing a feedback signal corresponding to the effective vehicle brake power provided by said electric brake system;

(d) a first bias signal;

(e) an electrical amplifier circuit having an output derived in a first operating condition from said feedback signal and said bias signal at a first amplification ratio and derived in a second operating condition from said feedback signal along at a second amplification ratio;

(f) detecting means operative in response to a decrease in said electric brake feedback signal for causing said amplifier circuit to change from said first operating condition to said second operating condition;

(g) said amplifier circuit comprising:

(i) a first amplifier having an input terminal and an output terminal;

(ii) a first resistor via which said electric brake feedback signal is connected to said first input terminal of said first amplifier;

(iii) a second resistor connected between said input and output terminals of said first amplifier;

(iv) a third resistor via which a second bias signal is connectable with said first amplifier input in parallel with said electric brake feedback signal;

(v) a fourth resistor between said output terminal of said first amplifier and said input terminal of said second amplifier;

(vi) a fifth resistor between said input and output terminals of said second amplifier;

(vii) a sixth resistor via which said first bias signal is connected to said second amplifier input terminal in parallel with said fourth resistor;

(viii) a first contact connected in series with said third resistor;

(ix) a second contact connected in series with said sixth resistor; and (x) switch means operative in response to operation of said detector means for operating said first and second contacts; and (h) operator means for subtracting said output signal of said amplifier circuit from said brake command signal to provide a difference signal in response to which said fluid pressure brake system is operative to provide supplemental brake power such that the total brake power of said vehicle corresponds substantially to said brake command signal during and following the transition from said electric brake system to said fluid pressure brake system.

2. A brake control system, as recited in claim 1, further characterized in that prior to said operation of said detector means, said amplifier circuit provides said output signal according to the equation $Eo=K(Ei+A)$, where Eo is said output signal of said amplifier circuit, K is said first amplification ratio of said amplifier circuit, Ei is said feedback signal, and A is said first bias signal having the same polarity as said electric brake feedback signal.

3. A brake control system, as recited in claim 2, wherein said second bias signal is of negative polarity and said first bias signal is of positive polarity.

4. A brake control system, as recited in claim 3, wherein said first contact is normally open and said second contact is normally closed, the normal state of said first and second contacts representating said first operating condition of said amplifier circuit, said first and second contacts being switched in response to operation of said switch means, to provide said second operating condition of said amplifier circuit, whereby said second bias signal is connected to said input terminal of said first amplifier by said first contact to reduce said electric brake feedback signal thereat, and said first bias signal is isolated from said input terminal of said second amplifier by said second contact to reduce the signal level at said input terminal of said second amplifier.

5. A brake control system, as recited in claim 4, further characterized in that said amplifier circuit, in said switched state of said first and second contacts, provides said output signal according to the equation $Eo=K\ (Ei-B)$, where Eo is said output signal, K is said second amplification ratio, Ei is said electric brake feedback signal, and $-B$ is said second bias signal.

* * * * *

UNITED STATES PATENT AND TRADEMARK OFFICE

CERTIFICATE OF CORRECTION

PATENT NO. : 4,685,750

DATED : August 11, 1987

INVENTOR(S) : Asaji Imanaka

It is certified that error appears in the above-identified patent and that said Letters Patent are hereby corrected as shown below:

Column 8, line 9, delete "along" and insert --alone-- line 11, delete "detecting" and insert --detector--

Signed and Sealed this

Twenty-sixth Day of April, 1988

Attest:

DONALD J. QUIGG

Attesting Officer

Commissioner of Patents and Trademarks